United States Patent [19]

Sellers et al.

[11] 3,862,260

[45] Jan. 21, 1975

[54] EPOXY CURING SYSTEM

[75] Inventors: Ralph F. Sellers; James R. Harvey, both of Somerville, N.J.

[73] Assignee: Union Carbide Corporation, New York, N.Y.

[22] Filed: May 7, 1973

[21] Appl. No.: 357,614

[52] U.S. Cl. ......... 260/831, 260/51 R, 117/126 GE
[51] Int. Cl.............................................. C08g 45/08
[58] Field of Search ..... 260/831, 51 R; 117/126 GE

[56] References Cited
UNITED STATES PATENTS

| | | | |
|---|---|---|---|
| 1,614,172 | 1/1927 | Mann | 260/51 |
| 3,390,128 | 6/1968 | Hughes | 260/51 |
| 3,493,630 | 2/1970 | Salensky | 260/831 |
| 3,644,269 | 2/1972 | Hoyt | 260/57 |
| 3,687,894 | 9/1972 | Collings | 260/831 |

*Primary Examiner*—Paul Lieberman
*Attorney, Agent, or Firm*—George A. Skoler

[57] ABSTRACT

This invention relates to a curing agent comprising a trifunctional hardener containing essentially three aromatic bonded hydroxyl groups and is the reaction product of 2,2'-bis(4-hydroxylphenyl)propane (hereinafter called "Bisphenol A"), phenol and formaldehyde and an imidazole in an amount of about 0.1 percent by weight to about 15 percent by weight based on the weight of the trifunctional hardener and to polyepoxide compositions containing this curing agent, which are characterized by excellent storage life, by excellent curing speed, good color, good solvent resistance, enhanced copper adhesion and good humidity resistance.

6 Claims, No Drawings

EPOXY CURING SYSTEM

This invention relates to epoxide curing agents and to epoxide compositions containing same. More particularly, this invention relates to epoxide curing agents which, when admixed with epoxides, provide curable epoxide compositions characterized by excellent shelf life and which, when heated to elevated temperatures, cure in a relatively short period of time to infusible products characterized by excellent physical, chemical and electrical properties. This invention constitutes an improvement over the invention disclosed in U.S. Pat. No. 3,493,630, issued Feb. 3, 1970, in that the trifunctional hardener provides lighter color, better solvent (chemical) resistance, retention of properties under humidity conditions, good copper adhesion (an important property for epoxy varnishes used in circuit board applications), and can be used in epoxy resin laminates with glass fabric to meet G-10 and FR-4 grades of National Electrical Manufacturers Association (NEMA) Standards, as set forth in its Standards Publications, Pub. No. LI 3-1961 (August 1961), Pub. No. LI1-1971 (September 1971) and Pub. No. LI1-1971 (including Revision No. 1 - December 1972).

The epoxide curing agents of this invention comprise: (1) the trifunctional hardener and (2) an imidazole.

Any substituted or unsubstituted imidazole is suitable for purposes of this invention. An imidazole is a substituted or unsubstituted five membered heterocyclic compound having 2 nitrogen atoms and 3 carbon atoms in its ring.

Among suitable imidazoles which can be specifically mentioned are the following: isoimidazole, imidazole, alkyl substituted imidazoles such as 2-methylimidazole, 2-ethyl-4-methylimidazole, 2,4-dimethylimidazole, 2-butylimidazole, 2-heptadecenyl-4-methylimidazole, 2-undecenylimidazole, 1-vinyl-2-methylimidazole, 2-n-heptadecylimidazole, 2-n-heptadecyl-4-methylimidazole and the like, generally wherein each alkyl substituent has a maximum of 17 carbon atoms and preferably contains a maximum of 6 carbon atoms; aryl substituted imidazoles such
- phenylimidazol,
- benzylimidazole,
- 2-methyl-4,5-diphenylimidazole,
- 2,3,5-triphenylimidazole,
- 2-styrylimidazole,
- 1-(dodecyl benzyl)-2-methylimidazole,
- 2-(2-hydroxyl-4-t-butylphenyl)-4,5-diphenylimidazole,
- 2-(2-methoxyphenyl)-4,5-diphenylimidazole,
- 2-(3-hydroxyphenyl)4-5-diphenylimidazole,
- 2-(p-dimethylaminophenyl)-4,5-diphenylimidazole,
- 2-(2-hydroxyphenyl)-4,5-diphenylimidazole,
- di(4,5-diphenyl-2-imidazole)-benzene-1,4,
- 2-naphthyl-4,5-diphenylimidazole,
- 1-benzyl-2-methylimidazole,
- 2-p-methoxystyrylimidazole, and the like generally wherein each aryl substituent has a maximum of 10 carbon atoms and preferably wherein each aryl substituent has a maximum of 8 carbon atoms.

The term "trifunctional" as used herein and in the claims means the presence in each mole of the hardener of essentially an average of three acidic hydroxyl groups, i.e., aromatic ring bonded hydroxyl groups.

The hardener of this invention is formed by the reaction of essentially one mole of Bisphenol A with essentially one mole of formaldehyde to form a monomethylol substituted Bisphenol A, followed by the condensation of that product with an excess amount of phenol, preferably at least about 3 moles of phenol to each mole of the monomethylol substituted Bisphenol A.

In the initial reaction, i.e., between Bisphenol A and formaldehyde, the reaction is conducted under alkaline conditions to produce the methylol substituted product. The second reaction i.e., between phenol and the methylol substituted Bisphenol A, is conducted under strong acid conditions to insure avoidance of methylene ether groups in the final product. In the initial reaction, the pH of the reaction solution should be about 8 to about 12. The second reaction is conducted at a pH of about 0.5 to about 3.

The conventional alkaline and acid catalysts in the art may be employed. Illustrative of such alkaline catalysts are, e.g., sodium hydroxide, potassium hydroxide, calcium hydroxide, barium hydroxide, ammonium hydroxide, and the like. Illustrative of such acid catalysts are, e.g., hydrochloric, phosphoric, sulfuric, oxalic, citric, lactic acids, and the like. The initial reaction is effected at temperatures of from about 70°C. to about 100°C. and the second reaction is effected at about 70°C. to about 100°C. The reaction may be effected in the presence of solvents, such as ketones, alcohols, ethers and the like. The process is preferably operated neat, i.e., in the absence of solvents.

In formulating the epoxide curing agents of this invention, the imidazole is simply admixed with the hardener in amounts of about 0.1 part by weight to about 15 parts by weight and preferably about 1.5 parts by weight to about 5 parts by weight per 100 parts by weight hardener.

The formulation of the curable epoxide compositions of this invention is conveniently accomplished by preparing the curing agent and adding the curing agent to the desired epoxide. Dry blending the individual powdered components can also be done if so desired or they may be put into a solvent solution.

The amount of curing agent used is sufficient to provide about 0.5 to about 1.5 phenolic hydroxyl groups per epoxide equivalent.

In making varnishes which meet the G-10 and FR-4 standards, bisphenol A additives are preferably added. For example, in making a G-10 standard varnish, amounts of 2,2'-bis(4-hydroxyphenyl)propane similar to that of the trifunctional hardener employed show favorable results and in the case of FR-4 standard varnish, 2,2'-bis(4-hydroxy-3,5-dibromophenyl)propane (commonly called "tetrabromobisphenol-A") may be added up to three (3) times the amount of hardener employed. Conventional epoxy resin solvents may be used, such as ketones, e.g., methyl ethyl ketone, methyl isopropyl ketone, methyl isobutyl ketone, and the like, and alcohols, such as methanol, ethanol, n-propanol, n-butanol, and the like.

In those instances wherein the resultant epoxide composition is to be used in molding applications, the curing agent, epoxide and suitable filler are admixed to form a blended composition which is compacted at room temperature and then granulated to the desired size. The granulated epoxide composition can then be molded to form such shaped articles as coil forms, capacitors, terminal blocks and the like.

As a rule, the filler which can be organic or inorganic such as nylon fiber, carbon black, silica, barytes, slate flour, clay and the like is used in amounts of about 30 to 80 percent by weight, based on the total weight of the composition. Also, mold release agents, colorants and the like can be added to the compositions.

The epoxide compositions are curved by heating to temperatures of about 125°C. to about 175°C. for 2 hours. Room temperature curing, which takes a number of days, is not practical.

The epoxides which can be utilized in accordance with this invention are those epoxides having more than one glycidyl group per molecule. These compounds, wherein the oxygen of the epoxy group is attached to vicinal carbon atoms, can be saturated or unsaturated, aliphatic, cycloaliphatic or heterocyclic and can be substituted with substituents such as halogen atoms, alkyl groups, ether groups and the like.

Illustrative of suitable epoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. Pat. No. 2,506,486 and polyphenylols such as the novolac condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. Pat. No. 2,885,385 to A. G. Farnham. The phenols may contain substituents such as alkyl or aryl ring substituents or halogens, as exemplified by the alkyl resorcinols, tribromoresorcinols and the diphenols containing alkyl and halogen substituents on the aromatic ring (Bender et al., U.S. Pat. No. 2,506,486). The polyhydric polynuclear phenols can consist of two or more phenols connected by such groups as methylene, alkylene or sulfone. The connecting groups are further exemplified by bis(p-hydroxylphenyl) methane, 2,2-bis(p-hydroxyphenyl) propane and dihydroxydiphenyl sulfone.

Process for the preparation of polyglycidyl ethers of polyhydric phenols is described in detail in the Bender et al. patent (supra) and U.S. Pat. No. 2,943,095 to A. G. Farnham et al.

Particularly desirable for purposes of this invention are the polyglycidyl ethers of the bis(hydroxyphenyl) alkanes, for example the diglycidyl ether of 2,2-bis(p-hydroxyphenyl) propane and the diglycidyl ether of bis-(p-hydroxyphenyl) methane. Other suitable polyglycidyl ethers of polyhydric phenols are enumerated in U.S. Pat. No. 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols and the like. (Methods of preparing polyglycidyl ethers of polyhydric alcohols are described in U.S. Pat. No. 2,898,349 to P. Zuppinger et al.)

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Pat. No. 2,870,170 to Payne et al. Also suitable are polyglycidyl compounds produced by reacting epichlorohydrin with aromatic amines, such as aniline, 2,6-dimethyl aniline, p-toluidine, m-chloro-aniline, p-aminodiphenyl methane, or with amino phenols, such as p-amino phenol, 5-amino-1-n-naphthol, 4-amino resorcinol, 2-methyl - 4 - amino phenol, 2-chloro-4-amino phenol and the like. Specific compounds include, among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups.

Polyglycidyl derivatives of aromatic amines and amino phenols and methods for their preparation are further described in U.S. Pat. Nos. 2,951,825 and 2,951,822 to N. H. Reinking and N. H. Reinking et al., respectively.

It is to be understood that all patents and literature references referred to in this specification are incorporated herein by reference.

The following examples further illustrate the present invention and are not intended to limit the scope thereof in any manner.

EXAMPLE I

The following ingredients in the amounts specified were combined to make the trifunctional hardener:

| Ingredients | Parts by Weight |
| --- | --- |
| Bisphenol A | 100.00 |
| 40% Aqueous Formaldehyde solution (formalin) | 32.89 |
| 50% Aqueous Sodium Hydroxide solution | 0.70 |
| Phenol | 206.05 |
| Oxalic Acid | 2.19 |
| Water | 21.92 |
| Methyl Ethyl Ketone | 78.95 |
| Total | 442.70 |

Procedure:

The Bisphenol A and formalin were charged to a still. The contents of the still were heated slowly up to 80°C, then the contents were agitated. Heating was continued to 95° - 100°C until a complete solution had been achieved. This may require up to two hours of heating. Then the charge was cooled to 75°C. and while cooling, a small vacuum was applied to the still. When the contents were at 75°C, cooling was stopped and the 50 percent NaOH solution was added. Then the still was placed under vacuum reflux condition by applying enough vacuum to contain the mild exotherm at 80°C via vacuum reflux. The vacuum reflux was held at 80°C for three (3) hours and the batch was cooled to 60°C by increasing the vacuum reflux and allowing the cooled condensed product to lower the batch temperature. At 60°C, the phenol was added followed by addition of the oxalic acid solution. The pH was adjusted for 0.9–1.1 and the charge was heated to atmospheric pressure reflux and a mild atmospheric reflux was held for nine (9) hours. Then the batch was distilled, at a good rate, to 150°C. At 150°C, 40°C water was fed to the condenser and the still was placed under vacuum distillation - applying full vacuum slowly.

The vacuum distillation was continued to 165°C to guard against freezing out phenol in the condenser.

The still was held at 165°C under full vacuum until distillation was complete, then the contents were cooled to 130°C. The methyl ethyl ketone was then added and cooling was continued to 35°C.

The contents were adjusted to 65 percent by weight solids by adding or distilling MEK as was needed.

By leaving out the methyl ethyl ketone, the trifunctional hardener can be recovered as a solid in the usual fashion.

EXAMPLE 2

An epoxy resin varnish meeting NEMA Grades G-10 and FR-4 were formulated from the following:

| Formulation | Parts By Weight | |
|---|---|---|
| | G-10 | FR-4 |
| Hardener of Example 1* | 13.0 | 13.0 |
| Methyl ethyl ketone (MEK)** | 20.0 | 20.0 |
| High Purity Bisphenol-A | 12.7 | — |
| Tetrabromobisphenol-A | — | 12.0 |
| Epoxy resin (diglycidyl ether of Bisphenol A)*** | 54.3 | 46.0 |

*100% solids basis
**MEK from Hardener of Example 1 (~7 parts) plus additional MEK to total 20 parts.
***Properties: Viscous liquid; viscosity at 25°C of 12,000 cps.; Sp. grav. of 1.16 25/25°C; epoxy equivalent, grams/grams mol of oxirane oxygen of 188.

Procedure

Both the G-10 and FR-4 varnishes are prepared at room temperature.

Charge the hardener of Example 1 and MEK to a mixing vessel (e.g., 55-gal. drum). Mix thoroughly using a propeller type agitator driven either by an air motor or an explosion-proof electrical motor. Continue agitation while slowly adding either Bisphenol A, in the case of G-10, or tetrabromobisphenol-A, in the case of FR-4. Continue agitation until completely dissolved (~15 minutes) and then slowly add the epoxy resin. Continue agitation (~15 minutes) to insure complete mixing.

The varnish was then combined with the cure catalyst as follows:

| | Parts by Weight | |
|---|---|---|
| | G-10 | FR-4 |
| Epoxy Varnish | 125.00 | 125.00 |
| 2-Phenylimidazole | 0.60 ⎫ | 0.67 ⎫ |
| Ethanol | 6.90 ⎬ 1 | 6.83 ⎬ 1 |
| MEK | 5.00 ⎭ | 5.00 ⎭ |

1 Dissolve the 2-Phenylimidazole in ethanol prior to addition to the varnish.

EXAMPLE 3

The resin was compared with a commercial dry, solid epoxy system, in glass fiber fabric laminates and evaluated for NEMA G-10 and FR-4 grade standards. In each case, the glass fabric was saturated with resin and dried in an oven at 275°F for a dwell time of 3½ minutes.

The laminations and results are depicted in Tables A and B below and compared with a conventional dry, solid epoxy system in physical properties.

TABLE A

| Properties | 1<br>NEMA FR-4<br>Specification<br>Requirement | 2<br>CS-1528*<br>"Volan"<br>ERSA-2550$^{(a)}$ | 3<br>CS-1528**<br>A-187<br>Varnish<br>of Ex. 2 |
|---|---|---|---|
| Curing System, % on Resin Solids | | 4.5 parts/100 of resin Dicyandiamide-1/3% Benzyl dimethyl amine | 0.67% 2-Phenyl-imidazole |
| Oven Temperature to dry prepreg, (°F.)/Dwell Time (Minutes) | | 300°F./4 minutes | 275°F./3½ minutes |
| Flexural Strength, LW, psi. | 55,000 | 73,600 | 69,000 |
| CW, psi. | 45,000 | 57,200 | 62,900 |
| (ASTM D-790-66) | | | |
| Izod Impact Strength, ft.-lb./inch LW | 7.0 | 13.0 | 15.0 |
| (ASTM D-256-56) CW | 5.5 | 9.0 | 11.0 |
| Water Absorption, Condition D 24/23, % Wt. Gain | 0.15 | 0.06 | 0.03 |
| (ASTM D-570-63) | | | |
| 1 mc Cond. A Dissipation Factor | 0.025 | 0.017 | 0.020 |
| Dielectric Constant | 5.2 | 4.5 | 4.9 |
| Cond. D 24/23 Dissipation Factor | 0.035 | 0.018 | 0.021 |
| Dielectric Constant | 5.4 | 4.6 | 5.0 |
| Cond. D 48/50 Dissipation Factor | 0.045 | 0.022 | 0.024 |
| Dielectric Constant (ASTM D-150) | 5.8 | 4.6 | 5.0 |
| Dielectric Strength Parallel to Lamination, kilovolts | | | |
| Cond. A | 45 | 55 | 72 |
| Cond. D 48/50 | 40 | 52 | 69 |
| (ASTM D-709-62T) | | | |
| Bond Strength, lb. | | | |
| Cond. A | 2,000 | 2,500 | 2,480 |
| Cond. D 48/50 | 1,600 | 2,490 | 2,440 |

TABLE A – Continued

| Properties | 1<br>NEMA FR-4<br>Specification<br>Requirement | 2<br>CS-1528*<br>"Volan"<br>ERSA-2550$^{(a)}$ | 3<br>CS-1528**<br>A-187<br>Varnish<br>of Ex. 2 |
|---|---|---|---|
| % Flexural Strength Retained at 200°F. (ASTM D-790-66) | | 70 | 79 |
| Flammability, Average Seconds to Extinguish (ASTM D-1433-58(65)) | 15 | 5 | 5 |
| Solder Float 20 Seconds at 500°F. | No blistering or delamination | No blistering or delamination | No blistering or delamination |
| Copper Peel Strength, lb./inch  1 oz. (ASTM D-903-49T) 2 oz. | 8<br>10 | 8.3 | 10.0 |

*Made by Clark-Schwebel Glass Corp., Anderson, S.C., contain methacrylato chromium chloride (Volan - trademark of E. I. duPont deNemours and Company, Inc., Wilmington, Delaware, plain weave glass fabric with a 42 × 32/in. pick count .007" thick.

**Same as * above except instead of Volan, it contains silane coupling agent A-187, which is gamma-glycidyloxypropyl trimethoxysilane, made and sold by Union Carbide Corporation, 270 Park Ave., New York, N.Y. 10017.

Conditions:

Treated prepreg to resin content of 38–40 percent and volatile matter is <1 percent Resin flow in prepreg at 340°F. and 500 psi. = 23–27 percent.

Four (4) prepreg panels cured 1 hour at 340°F. at 500 psi.

a. Solid Epoxy Resin - Epoxy equivalent weight on solids - 450-525 g./g. mole

TABLE B

| Properties-<br>ASTM's cited in<br>Table A above | NEMA G-10<br>Specification<br>Requirement | CS-1528*<br>"Volan"<br>ERSA-2539$^{(a)}$ | CS-1528**<br>A-187<br>Varnish<br>of Ex. 2 |
|---|---|---|---|
| Curing System, % on Resin Solids | | 4 PHR, Dicy. 3/4 % BDMA | 0.60% 2-Phenylimidazole |
| Trial Treater Temperature, (°F.)/Dwell Time (Minutes) | | 300°F./5 minutes | 275°F./3-1/2 minutes |
| Flexural Strength, LW, psi. | 55,000 | 71,600 | 70,000 |
| CW, psi. | 45,000 | 60,000 | 60,000 |
| Izod Impact Strength, ft.-lb./inch LW | 7.0 | 12.0 | 12.0 |
| CW | 5.5 | 9.0 | 9.0 |
| Water Absorption, Condition D 24/23, % Wt. Gain | 0.15 | 0.1 | 0.05 |
| 1 mc Cond. A Dissipation Factor | 0.025 | 0.021 | 0.017 |
| Dielectric Constant | 5.2 | 4.78 | 4.80 |
| Cond. D24/23 Dissipation Factor | 0.035 | 0.022 | 0.018 |
| Dielectric Constant | 5.4 | 4.70 | 4.83 |
| Cond. D48/50 Dissipation Factor | 0.045 | 0.028 | 0.019 |
| Dielectric Constant | 5.8 | 4.79 | 4.91 |
| Dielectric Strength Parallel to Lamination, kilovolts | | | |
| Cond. A | 45 | 59 | 65 |
| Cond. D 48/50 | 40 | 56 | 60 |
| Bond Strength, lb. | | | |
| Cond. A | 22,000 | 2,400 | 2,600 |
| Cond. D 48/50 | 1,600 | 2,300 | 2,500 |
| Solder Float, 20 Seconds at 500°F. | No blistering or delamination | No blistering or delamination | No blistering or delamination |
| % Flexural Strength Retained at 200°F | | 60 | 40 |
| Copper Peel Strength, lb./inch  1 oz. | 8 | 10 | 10.5 |
| 2 oz. | 10 | | |
| Conditions: Same as Table A above. | | | |

(a) Solid Epoxy Resin-Epoxy equivalent weight on solids- 450-525 g./g. mole

* and ** - see Table A above.

Chemical Resistance of G-10 and FR-4 Varnishes of Tables A & B:

| Resin System | Trichloroethylene Resistance Initial/15 Minutes[a] | MEK Resistance 5-Minute Immersion |
| --- | --- | --- |
| Example 2 Based G-10 | 65/60 | Unaffected |
| Solid Epoxy-Dicy G-10, Table B | 65/60 | Unaffected |
| Example 2 Based FR-4 | 65/60 | Unaffected |
| Solid Epoxy-Dicy FR-4- Table A | 65/60 | Unaffected |

[a] Barcol hardness measured after sample had been removed from vapor for three minutes.
"MEK" is the abbreviation of methyl ethyl ketone.

What is claimed is:

1. A curable composition comprising an epoxide having more than one glycidyl group per molecule and in an amount sufficient to provide about 0.5 to about 1.5 phenolic hydroxyl groups per epoxide equivalent, a curing agent comprising a trifunctional hardener of the reaction product of 2,2'-bis(4-hydroxyphenyl) propane, "with formaldehyde in about a 1:1 molar ratio under alkaline conditions, followed by reaction with excess phenol under acidic conditions," and an imidazole in an amount of about 0.1 part by weight to about 15 parts by weight per 100 parts by weight of the said hardener.

2. The cured product of the composition defined in claim 1.

3. A curable composition as defined in claim 1 wherein the imidazole is 2-phenylimidazole.

4. A curable composition as defined in claim 1 wherein the epoxide is diglycidylether of 2,2-bis(p-hydroxyphenyl) propane.

5. An epoxy varnish made from the composition of claim 1.

6. A glass fiber laminate comprising glass fiber fabric impregnated with the composition of claim 1.

* * * * *

UNITED STATES PATENT OFFICE
CERTIFICATE OF CORRECTION

Patent No. 3,862,260                     Dated   January 21, 1975

Inventor(s)   Ralph F. Sellers and James R. Harvey

It is certified that error appears in the above-identified patent and that said Letters Patent are hereby corrected as shown below:

Column 5, line 20, "12.0" should read -- 21.0 --.

Column 9, in Claim 1, lines 23 and 25, cancel the quotes.

Signed and Sealed this ninth Day of December 1975

[SEAL]

Attest:

RUTH C. MASON
*Attesting Officer*

C. MARSHALL DANN
*Commissioner of Patents and Trademarks*